United States Patent [19]

Puski et al.

[11] Patent Number: 4,697,004

[45] Date of Patent: Sep. 29, 1987

[54] PROCESS FOR PREPARING LOW PHYTATE SOY PROTEIN ISOLATE

[75] Inventors: Gabor Puski, Newburgh; Grant H. Hartman, Jr., Evansville; Robert D. Talbott, Newburgh, all of Ind.

[73] Assignee: Bristol-Myers Company, New York, N.Y.

[21] Appl. No.: 773,481

[22] Filed: Sep. 6, 1985

[51] Int. Cl.⁴ .............................................. A23J 1/14
[52] U.S. Cl. ................................... 530/378; 426/656; 435/69
[58] Field of Search ........................ 435/69; 530/378; 426/656

[56] References Cited

U.S. PATENT DOCUMENTS

| | | | |
|---|---|---|---|
| 2,732,395 | 1/1956 | Bolley et al. | 260/461 |
| 3,001,875 | 9/1961 | Sair | 99/17 |
| 3,261,822 | 7/1966 | Robbins et al. | 260/123.5 |
| 3,397,991 | 8/1968 | Johnson et al. | 99/17 |
| 3,594,192 | 7/1971 | Mullen et al. | 530/378 X |
| 3,645,745 | 2/1972 | Magnino, Jr. et al. | 530/378 |
| 3,736,147 | 5/1973 | Iacobucci et al. | 99/17 |
| 3,995,071 | 11/1976 | Goodnight, Jr. et al. | 530/378 X |
| 4,072,670 | 2/1978 | Goodnight | 260/123.5 |
| 4,375,431 | 3/1983 | Bradford et al. | 435/69 X |

OTHER PUBLICATIONS

McKinney, et al., *J. Biol. Chem.*, vol. 178, pp. 117-132 (1949).

Primary Examiner—Howard E. Schain
Attorney, Agent, or Firm—Robert H. Uloth

[57] ABSTRACT

A high quality soy protein isolate with significantly reduced aluminum content and substantially free of phytic acid and phytate complexes is prepared by aqueous extraction of defatted particulated soybeans at pH 8 to 10, and at a temperature above 65° C., separating the extract and then precipitating the protein out of solution, at a pH slightly higher than its isoelectric point, i.e., pH 5.3.

23 Claims, No Drawings

PROCESS FOR PREPARING LOW PHYTATE SOY PROTEIN ISOLATE

FIELD OF THE INVENTION

This invention is involved with seed protein isolation adapted for food use.

DESCRIPTION OF THE PRIOR ART

The prior art has dealt extensively with the subject of isolation, purification and improvement of the nutritional quality and flavor of soybean protein. Soybean protein in its native state is unpalatable and has impaired nutritional quality due to the presence of phytic acid complexes which interfere with mammalian mineral absorption, and the presence of anti-nutritional factors including trypsin inhibitors which interfere with protein digestion in mammals. The prior art has dealt with the destruction of trypsin inhibitors by heat treatment and with the removal of phytic acid. It has also dealt with improving the yields of protein secured as purified isolate relative to that contained in the soybean raw material.

McKinney, et al., J. Biol. Chem., Vol. 178, pages 117–132 (1949) disclose that phytin slowly dissociates from soybean protein in alkaline dispersions at pH 11.0 to pH 11.5 and may be removed by centrifugation.

Iacobucci, et al., U.S. Pat. No. 3,736,147 disclose an ultrafiltration process for the preparation of soy protein isolate having a reduced phytic acid content which involves various chemical treatments in combination with extensive ultrafiltration. Chemical treatment involves either enzymatic hydrolysis of the phytic acid by the enzyme phytase at neutral pH prior to ultrafiltration, ultrafiltration in the presence of calcium ion at low pH, or the used of ethylenediaminetetraacetic acid at a high pH.

Bolley, et al., U.S. Pat. No. 2,732,395, disclose a method for separation of phytin from various oil seeds. The method involves acid extraction of an oil free seed meal or flour with aqueous acid at a pH within approximately the isoelectric range of the particular seed protein, generally about pH 4.5. The phytin is recovered from the soluble portion and the protein is recovered from the curd by extraction at a pH greater than 8 with separation of insoluble materials, and subsequent coagulation of the protein in the clarified alkaline extract by acidification, again within the isoelectric range of the protein. The method is applied to various oil seeds including defatted soybean flour to provide purified protein which is allegedly substantially free from organic phosphorous compounds.

Sair, U.S. Pat. No. 3,001,875, involves aqueous extraction of defatted soy flakes at pH 6–10.5 to form a solution of the soy protein, removing insoluble materials, precipitating the extracted protein at pH 4.5, redissolving the curd at pH 6 and drying.

Johnson, U.S. Pat. No. 3,397,991, forms a protein isolate from a mixture of solvent extracted vegetable meals including soy meal to provide the desired amino acid composition in the resulting protein isolate by colloidally solubilizing the protein in water at 150°–200° F. and at pH of 9–12, separation of insoluble materials and recovering the solubilized protein from the aqueous solution by drying or by acid precipitation within the isoelectric range.

Robbins, et al., U.S. Pat. No. 3,261,822, illustrates preparation of soy protein isolate by extracting defatted soy flour with water at an acidic pH 3.5–5.5, discarding the soluble material and redissolving the protein curd in water at pH 6–11.

Goodnight, Jr., et al., U.S. Pat. No. 4,072,670, discloses a basic flaw in prior art processes for the preparation of acid precipitated soy protein isolate as exemplified in the Bolley, et al., and Robbins, et al. patents cited above. The prior art precipitated the soy protein in the flake with acid in the presence of phytic acid. Goodnight, et al., found that an alkali stable complex is formed between the protein and the phytic acid under these circumstances which prevents dissociation of the phytin from he soybean protein at alkaline pH as is disclosed in the McKinney, et al. article cited above. Goodnight, et al. solved some of the problems by the prior art by rendering the phytate insoluble at a pH of 10.6 to 14, and separating it from the proteins prior to the precipitation of proteins at their isoelectric point, i.e., pH 4.5.

The disadvantages of the process described by Goodnight, et al., are that exposure of proteins to extremely high alkaline pH will adversely affect their nutritional value, and that commercial continuous centrifuges were unable to separate the very light, suspended phytate precipitate formed at the high alkaline pH.

Prior art described processes which were successful to some degree in reduction of phytate content of soy isolates in a small laboratory scale. However, none of the above processes are capable of production of low phytate soy protein on an economic commercial scale.

SUMMARY OF THE INVENTION

The present invention provides a process for the preparation of an improved purified soy protein having exceptionally low phytic acid content, substantially improved palatability, improved functionality, high nutritional quality, and low ash content. Additionally, the instant process substantially reduces the aluminum content of the soy product produced. Aluminum content of soy based infant formulas is significantly higher than the content found in breast milk. Thus, infant formulas prepared from the instant soy protein isolate are more nutritionally acceptable since reduction of the aluminum content provides soy formula compositions more similar to breast milk.

The term "soy protein isolate having low phytate content" as employed herein is intended to be a soy protein product containing about 88% or more by weight of soy protein and less than about 0.3% by weight of phytates (expressed as phytic acid equivalent), preferably less than 0.2 g phytates per 100 g protein. Phytic acid, the hexaorthomonophosphate ester of myo-inositol, occurs at fairly high levels in grains and oil seeds as the calcium magnesium salt, phytin. In soybean meal, roughly 70% of the total phosphorous is accounted for by phytin. Based on an 0.6% phosphorous content of defatted soybean meal, approximately 2% by weight of phytin is calculated to be present in defatted soybean meal. Phytic acid will form a phytate-mineral-protein complex during processing and it has been shown to reduce the bioavailability of various minerals, such as zinc, magnesium, calcium, iron, etc. During the preparation of isolates, much of the phytic acid and phytates remain associated with the protein in the form of complexes. When the terms phytate or phytates are used herein, it is intended to include salts of phytic acid or molecular complexes of phytic acid with other soybean constituents. In the case of presently available commercial soybean protein isolates such as Edi-Pro A (Ralston Purina) and Ardex F (Archer Daniel Midland), as much as 2-2.5% by weight of the isolate is phytate. Phytate removal from soy protein isolate is desirable because phytate phosphorous is unavailable as a nutritional entity to humans and it interferes with the absorption of nutritionally essential multivalent cations, such as calcium, iron and zinc. Infants cannot utilize phytate phosphorous and the presence of relatively high amount of such unavailable phosphorous may lead to inadequate bone mineralization. Therefore, it is desirable to eliminate or reduce the phytate content of soy based infant formulas.

In its broadest concept, the present invention involves forming an aqueous solution of soy protein at pH 8.0–10.0 and at a temperature above 65° C., by aqueous extraction of a soybean raw material containing soy proteins. A preferred source of soy proteins is defatted particulate soybean, such as defatted soy flour, grits, or flakes. Prior contact of the native soybean material with acid results in the formation of a bond between the phytate and the protein and renders isoelectric or acid treated soy protein raw materials inappropriate for the present invention.

The above extract conditions minimizes the extraction of phytates and the formation of protein-phytate complexes. It also sensitizes the proteins to precipitation at a pH somewhat higher than their isoelectric point.

The above soy protein extract is clarified by centrifugation, filtration, or by other known means, and thereafter the soy protein is precipitated by acidification at pH 5.0–5.5, and the precipitate is recovered. At this pH, the phytate will be removed in the whey.

DETAILED DESCRIPTION OF THE INVENTION

In a typical commercial process, the soy proteins are extracted at slightly alkaline pH from soy flake or soy flour. The major protein fraction is then precipitated from the clarified extract by adjusting the pH to the isoelectric point of the proteins (pH 4.5). Since the proteins are insoluble at this pH, the protein can be separated from soluble sugars, salts, etc., by centrifugation. To complete the purification, the protein curd is washed with water at least once at this isoelectric pH, then the protein spray-dried either as is or after resolubilization at neutral pH. Under such conditions, a major portion of the phytate present in the soy flake will complex with the protein and will be present in the soy isolate. Typically, commercial soy isolates have a phytate content of 2.0–2.5% and in some instances as much as 3% by weight.

The treatment of soy proteins at high alkalinity (pH 11.6) may adversely affect the nutritive value or safety of such proteins. During many of the commercially available processes for preparing soy protein isolates, the proteins are precipitated at about pH 4.5. However, at this pH, a strong phytate-protein interaction takes place and most of the phytate will precipitate with the protein, resulting in a soy protein isolate having more than 2% phytate.

The present invention provides further improvements to the prior commercial process by eliminating the exposure to extreme alkalinity and most important provides for the first time an economic process for the production of soy isolates in good yield and having phytate concentrations of 0.3% by weight or below.

The soy protein raw material for the process is particulate defatted soybean, preferably defatted soy flour or defatted soy flakes. The process involves forming an aqueous solution of soy protein at an alkaline pH from the soy protein containing raw material. It is not intended to limit the invention to any type of raw material, nor is it intended to limit the invention to any specified manner of preparing this initial soy extract since many modifications may be made depending upon the various objectives of the process.

The initial extraction slurry is formed by adding with agitation, one part by weight of soy protein containing raw material to 10 to 20 parts by weight of aqueous slurry media at a pH of 8 to 10 and a temperature above 65° C. Although higher pH's may be employed, it has been found that at such higher pH's, there is a tendency to increase the undesirable formation of lysinoalanine. Preferably, the pH is maintained at 8.5 to 9.5 at a temperature of 70° C. to 85° C. and most preferably 75° C. to 80° C. Although temperatures higher than 85° C. may be satisfactorily employed during extraction, it has been found that at such higher temperatures there is a tendency to increase the undesirable formation of lysinoalanine. The slurry is maintained at the desired pH and temperature for about 1 to 15, and preferably 2 to 5 minutes.

Thereafter, the temperature is reduced rapidly to 25° C. to 65° C., preferably 50° C. to 60° C., and most preferably to 55° C. to 60° C. and the slurry maintained at such temperature for an additional 10 to 60 minutes, and preferably 10 to 30 minutes, to continue extraction of the soy protein from the raw material.

The insoluble fraction containing a substantial portion of the phytates and carbohydrates is separated from the solubilized protein fraction by conventional solid separation unit processes such as filtration or centrifugation.

The foregoing temperature ranges are the optimum values for dissociation of the soluble soy protein from the phytic acid complex and for maintaining the phytates and phytic acid derivatives substantially insoluble. Under some manufacturing conditions, however, other temperature ranges may prove to be more suitable since the temperature at which the phytate solubility is formed has an effect on the physical nature thereof which affects its filtration and centrifugation characteristics. Empirical selection of the optimum phytate solubilization temperature for any given manufacturing arrangement is, of course, desirable.

The pH of the solubilized protein fraction is adjusted to pH 5.0 to 5.5 and preferably pH 5.2 to 5.4 and most preferably 5.3 with a non-toxic water soluble acid such as hydrochloric acid to precipitate the solubilized soy protein. Although pH's higher than 5.5 may be employed, such pH's tend to decrease the yield of soy protein. The protein is precipitated out of the solubilized protein fraction at a temperature of 25° C. to 65° C., preferably 50° C. to 60° C.

The precipitated protein is separated from sugars, soluble phytate, etc., by centrifugation or other conventional means. The pH selected will precipitate the heat sensitized proteins, but will allow the soluble phytate to be washed out in the whey. Protein-phytate complex will not form, since at this pH both proteins and phytates are negatively charged. Such a complex would form at or below pH 4.5.

The precipitated and separated protein may be washed with water, then it may be resuspended in water, the suspension wet milled, and then spray dried or lyophilized. Alternatively, protein curd may be redissolved in dilute aqueous solution at a pH in excess of the isoelectric range and the resulting solution spray dried as is known in the art for the production of so-called soy proteinates.

Finally, rather than spray drying, the precipitated and separated protein may be redissolved at a pH in excess of the isoelectric range, and the resulting soy proteinate solution may then be formulated without drying into dietary products by combination with the desired carbohydrate and fat ingredients and, if desired, vitamins, minerals, flavors, etc. This is not only a convenient mode of operation from the standpoint of combining the various ingredients, but also it affords a liquid dietary product having improved functional characteristics such as solubility, suspendability, viscosity, mouth feel and emulsion stability.

In carrying out the process of the present invention, it has been found that temperature of extraction, pH of extraction, pH of precipitation, temperature of precipitation and the amount of washing are important in obtaining the desired results. The yield is also affected by the length of extraction, and the number of times the soy flour is re-extracted.

EXAMPLE 1

One kilogram of defatted soy flour is slurried with 16 kilograms of hot water at pH 9 and maintained at 75° C. for 2 minutes. The slurry is then cooled rapidly to 50°-60° C. and extracted for 10-30 minutes longer. The insoluble portion is separated by centrifugation. The pH of the supernatant is adjusted to pH 5.3 with hydrochloric acid, and the insolubilized protein curd which precipitates out is separated by centrifugation. The curd then may be washed once by resuspending it in 10-16 kilograms of water at pH 5.3-5.4 and at a temperature of 50°-60° C. and then recentrifuged. The washed curd is collected and may be spray dried as is, or neutralized first with an appropriate alkali and the spray dried.

EXAMPLE 2

The process of Example 1 was repeated six times with the following results:

| Percent Phytate and Yield of Soy Isolates Prepared According to the Process of the Invention | |
| --- | --- |
| % Phytate[a] | % Yield (g soy isolate/100 g soy flour) |
| 0.02 | 31.3 |
| 0.03 | 28.9 |
| 0.05 | 30.5 |
| 0.05 | 30.9 |
| 0.11 | 29.9 |
| 0.07 | 30.4 |

[a]Commercial soy isolates have a phytate content of 2-2.5% and these values illustrate that the soy isolate of the instant invention has only about 1-5% of the phytate content found in commercial soy isolates.

| Comparison of Aluminum Content of Soy Isolates Prepared According to the Process of the Invention and Commercial Soy Isolate (EdiPro A) | | | |
| --- | --- | --- | --- |
| | Sample 1 | Sample 2 | EdiPro A |
| Aluminum (mcg/g) | 7.5 | 6.2 | 24-40 |
| Phytate % | 0.11 | 0.13 | >2 |

The above data clearly demonstrates the ability of the instant process to produce soy isolate having substantially no phytates at relatively good yields with significant reduction in aluminum content.

EXAMPLE 3

Soy isolate samples were prepared according to the procedures of Example 1 with variation in extraction temperature and pH, and precipitation pH, as shown in the following table. The % phytate in finished soy isolate and yield is also included.

| Sample No. | Extraction Temp In °C. | pH | Precipitation pH | % Phytate | % Yield |
| --- | --- | --- | --- | --- | --- |
| 1 | 75 | 9.0 | 5.3 | 0.02 | 31.3 |
| 2 | 65 | 9.0 | 5.3 | 0.46 | 32.7 |
| 3 | 88 | 9.0 | 5.3 | 0.04 | 29.9 |
| 4 | 75 | 8.0 | 5.3 | 0.20 | 28.6 |
| 5 | 75 | 10.0 | 5.3 | 0.08 | 32.5 |
| 6 | 75 | 9.0 | 5.2 | 0.06 | 31.4 |
| 7 | 75 | 9.0 | 5.5 | 0.02 | 29.4 |
| 8 | 40 | 8.0 | 5.3 | 0.41 | 28.0 |
| 9 | 75 | 9.0 | 4.5 | 0.54 | 31.3 |
| 10 | 40 | 8.0 | 4.5 | 1.96 | 32.9 |

As shown above, very low phytate content can be achieved when the soy isolate is prepared under the experimental conditions described in this patent application. Medium range phytate content can be achieved if some of the teachings of this application are employed, such as when commercial extraction conditions are combined with the acid precipitation conditions of instant application (sample 8), or when the protein extract conditions of instant application is combined with the typical pH of precipitation (sample 9). Sample 10 shows typical conditions for preparation of commercial soy isolate with its high phytate content.

What is claimed is:

1. A process for preparing a soy protein isolate with significantly reduced aluminum content and substantially free of phytate which comprises treating a defatted soybean raw material containing soy protein by forming a slurry with an aqueous medium at a pH within the range of pH 8 to 10 and at a temperature above 65° C. for a period of time sufficient to solubilize the soy protein; but reduce extraction of phytates; separating said slurry into an insoluble fraction containing a substantial portion of the polysaccharides and insoluble phytates and a soluble fraction which includes the solubilized soy protein; adjusting the pH of said soluble fraction above the isoelectric range to 5.0 to 5.5 to precipitate the soy protein and thereby produce a whey fraction containing soluble phytate and a soy protein solids fraction having a phytate concentration below 0.3%.

2. The process of claim 1 wherein said soy protein fraction is dried.

3. The process of claim 1 wherein said soy protein fraction is formed into an aqueous solution at a pH in excess of the isoelectric range of said soy protein.

4. The process of claim 3 wherein said soy protein fraction is dried.

5. The process of claim 1 wherein said aqueous medium is water and said soy protein containing raw material is slurried therewith in a ratio of one part of raw material to 10-20 parts by weight of water.

6. The process of claim 5 wherein one part by weight of said soy protein containing raw material is slurried with 16 parts by weight of water.

7. The process of claim 1 wherein said soy protein raw material is maintained in said slurry at 70° C. to 85° C. for 1 to 15 minutes and for an additional 10 to 60 minutes after said slurry temperature is adjusted to 50° C. to 60° C.

8. The process of claim 7 wherein the pH of said soluble fraction is adjusted to pH 5.2 to 5.4 after the separation from said spent solids at a temperature of about 50° C. to 60° C.

9. The process of claim 8 wherein the pH of said solubilized soy protein solids is adjusted to pH 5.3.

10. The process of claim 1 wherein said defatted soybean raw material is defatted soybean flakes.

11. The process of claim 10 wherein one part by weight of said raw material is slurried with 16 parts by weight of water adjusted to pH 9 and at a temperature of 75° C. for 2 minutes, said slurry then cooled to 60° C. and stirred for an additional 10 minutes, said slurry then being separated into an insoluble fraction and a soluble fraction, discarding said insoluble fraction and adjusting the pH of said soluble fraction to 5.3 thereby precipitating a protein curd from said slurry, separating said protein curd, washing said protein curd with 10 parts by weight of water at pH 5.3, and separating said washed protein curd from said wash water.

12. The process of claim 11 wherein said washed protein curd is dried.

13. The process of claim 11 wherein the pH of said washed protein curd is formed into an aqueous solution at a pH in excess of the isoelectric range of said soy protein.

14. The product produced by the process of claim 1.

15. The product produced by the process of claim 2.

16. The product produced by the process of claim 4.

17. The product produced by the process of claim 6.

18. The product produced by the process of claim 9.

19. The product produced by the process of claim 11.

20. A process for preparing a soy protein isolate substantially free of phytate and with significantly reduced aluminum content which comprises in sequence the steps of:
  (a) forming an aqueous slurry of a defatted soybean raw material at a pH within the range of 8–10 at a temperature above 65° C. for a period of 1–15 minutes to solubilize the soy protein;
  (b) reducing the temperature to 25°–65° C. for a period of 10–60 minutes;
  (c) separating said slurry into an insoluble fraction and a soluble fraction which includes the solubilized soy protein;
  (d) adjusting the pH of said soluble fraction to pH 5.0 to 5.5 with a non-toxic water soluble acid at a temperature of 25°–65° C. thereby precipitating and separating said soy protein isolate substantially free of phytate and with significantly reduced aluminum content.

21. The process of claim 20 wherein step (a) is carried out at pH of 8.5 to 9.5 at 70°–85° C. for 1–15 minutes; step (b) is carried out at 50°–60° C. for 10–60 minutes; and step (d) is carried out at pH 5.2–5.4 at 50°–60° C.

22. The process of claim 20 wherein step (a) is carried out at pH 8.5–9.5 at 75°–80° C. for 2–5 minutes; step (b) is carried out at 55°–60° C. for 10–30 minutes; and step (d) is carried out at pH 5.3 at 50°–60° C.

23. The process of claim 1 wherein said soy protein solids fraction having a phytate concentration below 0.3% is washed in an aqueous media and then separated from the aqueous Wash media.

* * * * *